UNITED STATES PATENT OFFICE.

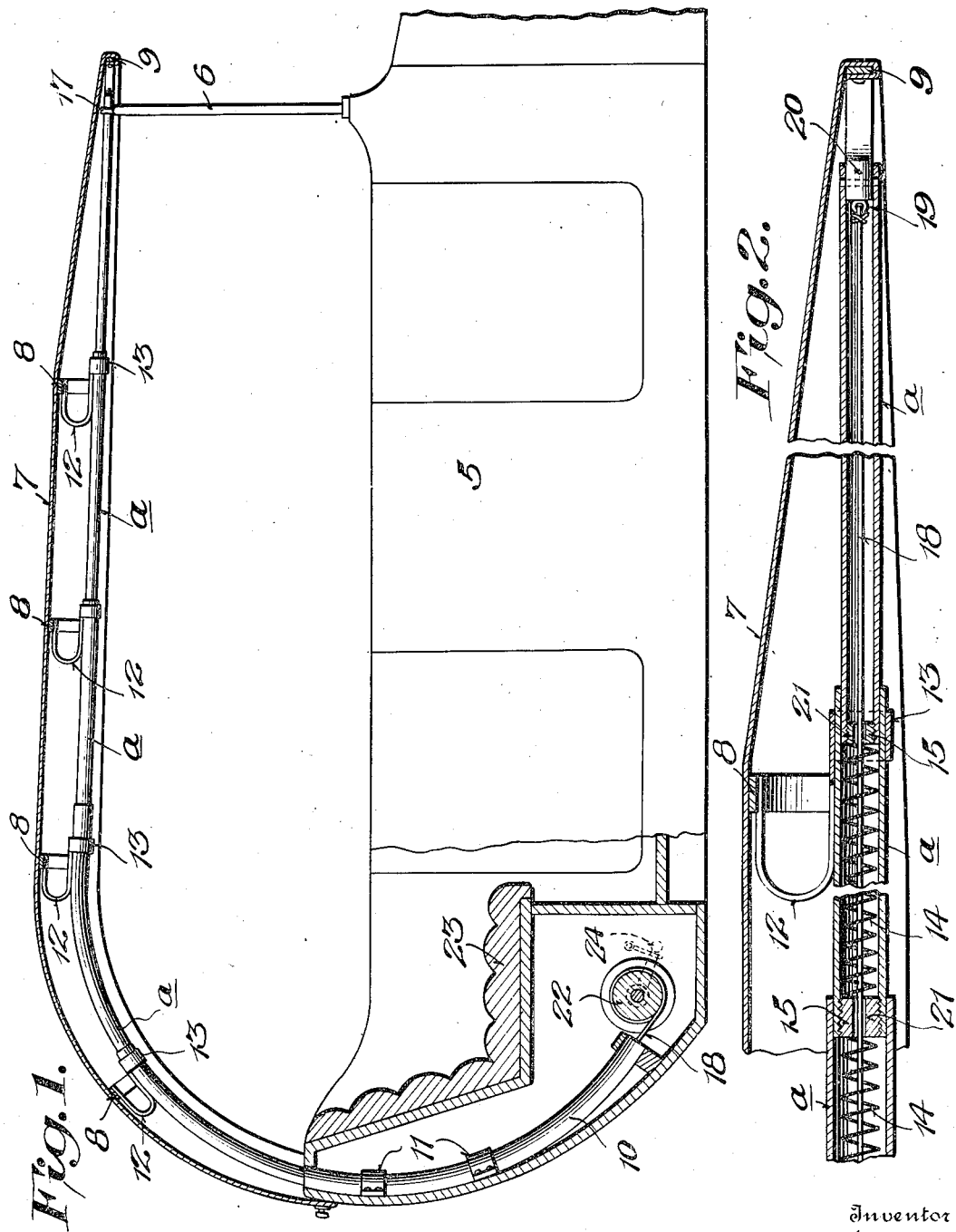

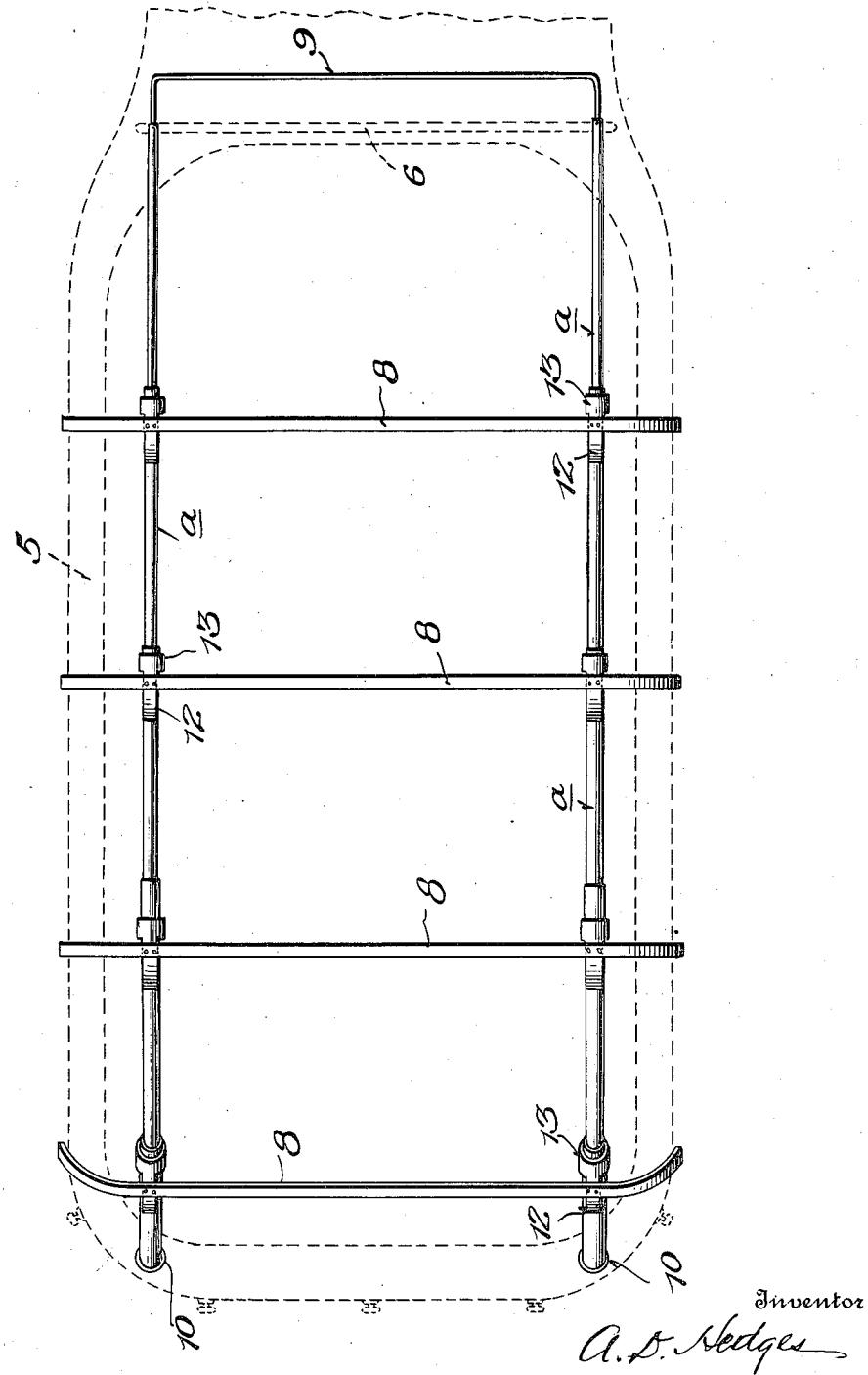

ABRAHAM D. HEDGES, OF LONG BEACH, CALIFORNIA.

AUTOMOBILE-TOP.

1,321,913. Specification of Letters Patent. Patented Nov. 18, 1919.

Application filed January 21, 1919. Serial No. 272,270.

*To all whom it may concern:*

Be it known that I, ABRAHAM D. HEDGES, a citizen of the United States, residing at Long Beach, in the county of Los Angeles and State of California, have invented certain new and useful Improvements in Automobile-Tops, of which the following is a specification.

This invention relates to an automobile top and has for one of its objects a top supporting frame constructed to be readily locked or secured in folded or "down" position at the rear of the automobile body, and upon release of the locking or securing means, the top and its frame are adapted to move automatically, slowly and effectively, without jar or strain, over the body of the vehicle to assume and maintain what is known as "up" position.

Another object is to provide what is known as a "one man top", for automobiles or other vehicles, which is constructed and arranged whereby upon the release of a simple locking device, the top will automatically unfold and operate to assume its covering or "up" position over the body of the vehicle.

With the above and other objects in view, the present invention consists in the combination and arrangement of parts hereinafter more fully described and illustrated in the accompanying drawings and particularly pointed out in the appended claims, it being understood that changes in the form, proportions, size and details may be made, without departing from the spirit of the invention or sacrificing any of the advantages thereof as defined in the appended claims.

In the drawings:

Figure 1 is a side elevation partly in sections.

Fig. 2 is an enlarged, detailed, longitudinal sectional view of one of the side bars of the top supporting frame.

Fig. 3 is a plan view of the supporting framework.

Referring now more particularly to the accompanying drawings, the body of an automobile or other vehicle, is indicated at 5 and provided with a wind shield 6.

The essential feature of the present invention goes to the top supporting frame and this top supporting frame is indicated generally by the reference character A. This supporting frame is designed for the support of the cover 7 of leather or other substitute therefor or any other suitable covering material. The covering material is preferably supported slightly above the supporting frame, as shown particularly in Fig. 1.

The supporting frame consists of side bar members *a* connected by transverse bows 8 and at their outer ends connected by a cross piece 9 to which latter the forward end of the covering material 7 is secured in any suitable manner, and which cross piece may be secured to the side bars *a* in any suitable manner.

The side bars *a* of the supporting frame are composed preferably of tubular telescoping sections, of which there may be any desired or practical number, and which include straight and one or more curved sections, the curved section of each side bar being disposed at the rear ends of the side bars and adapted, upon the folding of the frame, to telescope into similarly curved receiving sockets 10, which are secured at the corners of the body 5 to the inner surface of the rear wall of the body by means of suitable fastening elements 11. The straight sections also telescope into one another and when the supporting framework is folded the curved sections are received within the sockets 10, while the straight sections which telescope together extend upwardly from the sockets and occupy a projecting position approximately the length of one of the straight telescoping sections. While the socket receiving members 10 may be curved so as to receive the curved innermost sections of the side bars, this curvature of the socket members is shown in this form because of the curvature of the innermost tubular sections of the side bars *a*.

The bows 8 are supported by means of peculiarly formed brackets 12 each of which has a sleeve portion 13 slidably mounted on the outermost end of the corresponding tubular sections, as shown, so that the tubular sections of each bar may be telescoped into a rear tubular section up to a point substantially to the point of the sleeve 13 on the forward section. It will be noted that the brackets increase in size progressively from the rear to the front of the top and this is done so that there will be no interference of the brackets in the folding of the top frame in the manner hereinafter explained.

A coil or other spring or other type of resilient element 14 is mounted in each of the tubular sections, except the forward sections. These resilient elements 14 are arranged so that the resilient element 14 of one section will bear at one end against a plug 15 in the rear of the section in which the element 14 is located and against a plug 15 at the rear end of the tubular section, immediately in advance of the section in which the spring is located, so that by virtue of the expansion of the resilient elements 14, the tubular sections are automatically forced slowly outwardly under the tension of these springs in their expansive action, between said plugs, as should be well understood from the foregoing. To fold the top, pressure is brought to bear upon the front connecting piece 9 and the side bar sections *a* are telescoped within one another and forced into the tubular receiving socket members 10 against the tension of the resilient elements 14 and the top is then locked in such a way that the resilient elements 14 cannot force the sections outwardly to "up" position. To this end, any suitable locking device may be employed. Immediately upon release of this locking device, the resilient elements 14 will force the top frame to "up" position and hold the top frame in "up" position, but in order to prevent wabbling, it is preferable to connect the top frame when in "up" position to the wind shield 6 by means of straps or other suitable devices 17.

Another way in which the top frame might be telescoped and folded is to provide suitable wire rope or other cables 18, there being a cable 18 located in each of the tubular side members *a*. The outer ends of the cables 18 are preferably connected to eye bolts 19 secured in plugs 20 located in the outer ends of the outermost or forward tubular sections of the side bars *a*. These cables 18 are adapted to extend through apertures 21 formed in said plugs 15 and through the convolutions of the resilient elements when the latter are formed of helical springs 14 as shown. The rear ends of these cables pass down through the receiving socket members 10 and are secured to the ends of a roller 22, secured preferably under the seat 23 at any point thereunder or, if desired, this roller 22 may be located elsewhere in the body of the vehicle. In any event, the cables 18 are connected to this roller 22 and to fold the top in a way other than by rearward pressure of the connecting piece 9, the roller 22 may be turned by means of a suitable lever 24 projecting through the body to the outside thereof and by winding of the cables 18 upon this roller 22, the tubular side member sections may be telescoped into one another with a consequent pulling of all the sections into telescopic relation and into the socket members 10 at the rear of the body, and with the forward tubular sections projecting only slightly above the body and the sections all practically concealed within one another and within the socket receiving members 10, the curved sections being telescoped into the curved sockets 10 and the straight sections being telescoped together in the manner heretofore explained. Then as hereinbefore stated, the locking device is operated to prevent the resilient elements 14 from forcing the top to "up" position.

From the foregoing, it will be seen that I provide a simple, economical, durable and efficient top for automobiles or other vehicles and that the same may be easily, readily and positively folded to maintain the top in "down" position, and that by the mere release of a simple locking device, that the top may be automatically moved into and assume and maintain what is known as the "up" position, enabling one person to readily, easily and quickly manipulate the top either for raising or lowering the same, the raising of the top being automatic upon mere release of a suitable locking device as stated.

What is claimed is:—

1. In a top for vehicles, a top frame composed of telescoping side bars having straight and curved sections, cross-bows freely slidable on the side bars, a cover secured to the bows, means for fastening the frame and cover in folded position at the rear of the vehicle, and means normally forcing the frame and cover to covering position and actuated for such purpose upon release of said fastening means.

2. In a top for vehicles, a top frame composed of telescoping side bars having straight and curved telescoping sections forming continuous side bars and cross bows slidable on the side bars, a cover secured to the bows, means for fastening the frame and cover in folded position at the rear of the vehicle, and means whereby upon release of the fastening means the top and frame moves automatically to covering position over the vehicle, means for fastening the top frame at its front end to the vehicle, and means extending along the curved and straight sections and adapted to be operated from one end whereby upon unfastening the latter fastening means the top and its frame may be drawn upon and folded at the rear of the vehicle.

3. In a top for vehicles, a top frame composed of telescoping side bars having straight and curved sections, cross-bows mounted upon the side bars, a cover secured to the bows, yieldable elements confined within all sections of the side bars except the rear section of each side bar, said yieldable elements adapted to force the respective side bar sections and the bows to covering position, means for fastening the side bar sections and the cover in folded position, and releasable to permit the side bar sections and the bows and the cover to move to covering position over the vehicle, and means to fasten the side bar sections and cover in covering position.

4. A top frame for automobiles or other vehicles including curved and straight telescoping side bar sections, cross bows slidably carried by the side bar sections, means arranged within the sections to normally force the sections outwardly so as to normally maintain the top frame in raised position, said sections adapted to telescope so that the top frame may be folded back and located at the rear of the vehicle, and flexible means extending along the curved and straight telescoping sections and connected with the top frame at the front thereof and provided at the back of the vehicle with operating means for folding the top frame.

5. A top frame for automobiles or other vehicles including a plurality of curved tubular telescoping sections and a plurality of straight tubular telescoping sections extending from and forming a continuation of the curved tubular sections to provide continuous bars when extended, a plurality of springs arranged within the tubular sections, a continuous flexible connection extending through the curved and straight tubular sections and connected at its front end with the front of the top frame, and an operating device arranged at the back of the vehicle and having means for winding the flexible connection on which to fold the top frame.

6. A top frame for vehicles including telescoping side bar sections, cross-bows mounted on the side bar sections, a cover secured to the bows and at its front end secured to the front side bar sections, means for automatically forcing the side bar sections and the cover to covering position, means for locking the side bar sections and the cover in folded position against the action of the said automatic forcing means, flexible elements operatively connected to and passing through the telescoping side bar sections to the rear of the vehicle, means connected to said flexible elements and operable to draw upon said flexible elements to draw the side bar sections, the bows and the cover to the rear of the vehicle to fold the same.

7. A top frame for automobile coverings comprising side bars, brackets arranged in pairs and slidably mounted on the side bars and provided with resiliently projecting supporting means, and bows connected to the resilient supporting means and arranged in spaced relation with the side bars and adapted to support a flexible covering.

8. A top frame for automobile coverings comprising side bars, brackets arranged in pairs and slidably mounted on the side bars and provided with upwardly extending approximately U-shaped resilient supporting portions, and bows mounted on the supporting portions and arranged in spaced relation with the side bars and adapted to support a flexible covering.

9. A top frame for automobile coverings comprising side bars, brackets composed of sleeves slidable along the side bars and upwardly projecting approximately U-shaped resilient supporting portions located above the side bars, and transverse bows extending across the top frame and secured at spaced points to the resilient supporting portions and having depending side portions located at opposite sides of the side bars and arranged in spaced relation with the same.

In testimony whereof I affix my signature.

ABRAHAM D. HEDGES.